Feb. 19, 1957     C. A. SCHELLENS     2,782,002
NOZZLE STRUCTURE FOR FLUID-DRIVEN TURBINES
Filed Oct. 24, 1952
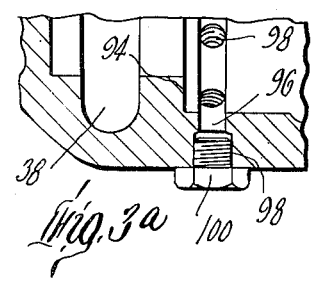
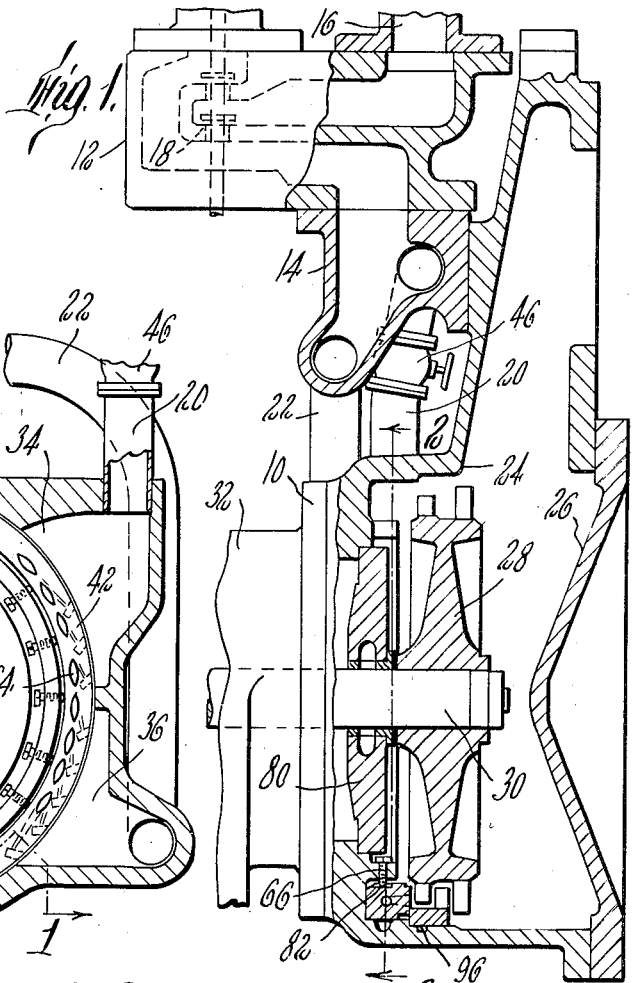
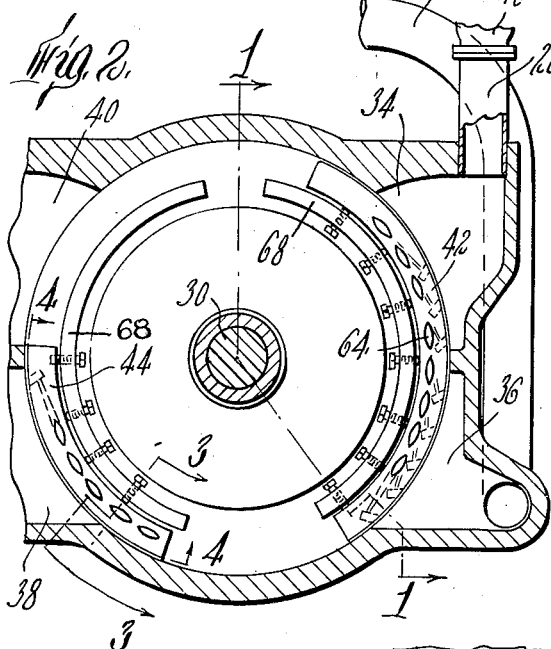
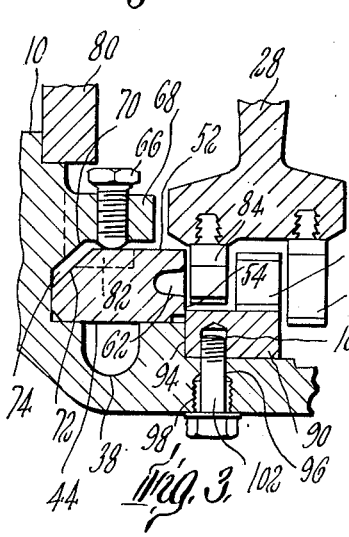
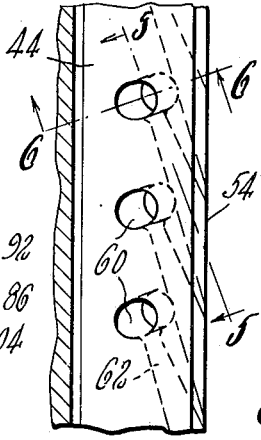
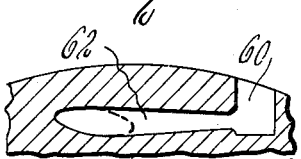
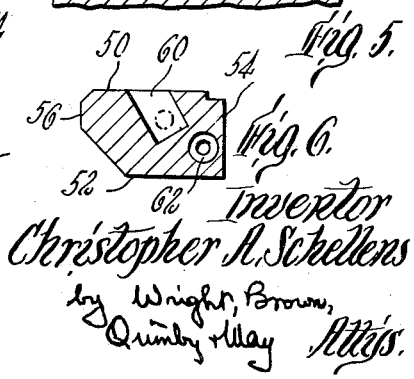
Inventor
Christopher A. Schellens
by Wright, Brown,
Quinby & May Attys.

United States Patent Office 2,782,002
Patented Feb. 19, 1957

2,782,002

NOZZLE STRUCTURE FOR FLUID-DRIVEN TURBINES

Christopher A. Schellens, St. George, Maine

Application October 24, 1952, Serial No. 316,755

7 Claims. (Cl. 253—78)

This invention relates to fluid-driven turbine nozzles, and more particularly to nozzles for turbines which are designed for end assembly. It is an object of the invention to reduce the space occupied by the nozzles in both the axial and the radial directions to a minimum. For convenience of description, the term "steam" is hereinafter used to signify steam or any other equivalent fluid.

Another object of the invention is to keep the high-pressure steam which enters the nozzles as far as possible away from the housing for the turbine bearings. The steam passing through the turbine is at its highest pressure and temperature before it enters the nozzles. Hence, it is desirable to avoid as far as possible heating the turbine casing in the vicinity of the bearing housing by high temperature steam.

Another object of the invention is to dispense with the tension bolts which are usually employed to secure the nozzle blocks to the steam belts or supply chambers, and to employ instead compression bolts which are located in such a way as to be protected from temperatures approximating those of the entering steam.

A further object of the invention is to design the parts of the turbine so that not only are the foregoing objects achieved but the resulting turbine is easily and conveniently assembled and disassembled.

For a more complete understanding of the invention, reference may be had to the following description thereof, and to the drawing of which—

Figure 1 is a side view of a steam turbine, a portion being broken away to show in a section taken on the line 1—1 of Figure 2;

Figure 2 is a section on the line 2—2 of Figure 1, the arcuate ribs and nozzle blocks being shown in elevation;

Figure 3 is a section on the line 3—3 of Figure 2, on a larger scale;

Figure 3a is a fragmentary section of the portion of the turbine casing which appears in Figure 3;

Figure 4 is a section on line 4—4 of Figure 2, on a larger scale;

Figure 5 is a fragmentary section on a plane, indicated by the line 5—5 of Figure 4, which contains the axes of one of the bowls and its cone; and Figure 6 is a section of a nozzle block, taken on a plane, indicated by the line 6—6 of Figure 4, which contains the axis of a bowl and is perpendicular to the axis of the connected cone.

Figure 1 shows a steam turbine 10 together with a steam chest 12 and a manifold 14. Steam is admitted into the chest through an inlet pipe 16. In the chest it passes a balanced control valve 18 and proceeds into the manifold 14. From the manifold four pipes extend to corresponding fluid supply chambers or steam belts in the turbine, two of these pipes 20 and 22 being shown in the drawing. The casing of the turbine 10 comprises a main member 24 and a circular cover member 26 which closes an opening in the front of the casing through which the turbine wheel or rotor 28 may be introduced when the turbine is being assembled. The casing member 24 includes a separately removable part 80 which is a disk or diaphragm. The wheel 28 is keyed on a shaft 30 which projects through the center of the diaphragm 80 and is provided with suitable bearings (not shown) enclosed in a bearing housing 32. Within the rear portion of the casing member 24 are separate cavities in the inner surface thereof surrounded by concave arcuate portions of the inner surface and forming fluid supply chambers or steam belts 34, 36, 38, and 40 which provide for feeding sufficient nozzles to develop the maximum capacity for which the various parts of the machine are designed. Each of these steam belts opens into the main enclosure of the casing through an elongated aperture, such aperture being covered by a nozzle block if steam is supplied to that steam belt. It is frequently desirable to utilize a turbine of this type for greatly reduced rated powers or with elevated steam pressures, both of which conditions would require a much smaller nozzle capacity. For such purposes, any or all of the four steam belts except one may be left unused, the steam pipes which would lead thereto, such as 20 and 22, being omitted, the holes through which such pipes would communicate with the manifold 14 and the steam belts being left undrilled or, if drilled, being plugged.

It is also under certain conditions desirable to provide for periods of temporary overload or for conditions of low steam pressure. For such purpose a spare steam belt may be constructed to be available when wanted, but ordinarily not in use. Any one of the belts may be designated as the extra belt, a valve 46 being employed in the steam line leading to such belt to make the spare nozzles available whenever desired.

In the embodiment of the invention illustrated in Figure 2, two nozzle blocks 42 and 44 are used, the block 42 covering the elongated apertures of the steam belts 34 and 36 and the block 44 covering the aperture of the steam belt 38, the steam belt 40 being left unused. While in the machine illustrated each steam belt can accommodate five nozzles, it may be desirable to leave some of the nozzles undrilled. For example, three nozzles are shown in communication with the steam belt 34. The hand valve 46 can be employed to admit to these three nozzles or to shut steam off therefrom. If the machine is to be set up to utilize only one steam belt on a side, short blocks such as the block 44 can be used, but if both steam belts on either side are to be utilized, then a longer block such as the block 42 is employed to cover the apertures of both steam belts.

According to the invention, each nozzle block is arcuate in shape as indicated in Figure 2. Each nozzle block thus has a convex surface 50 which defines a circular cylinder coaxial with the shaft 30, a concave surface 52 concentric therewith, a front plane surface 54, and a rear plane surface 56 which is parallel to the front surface 54. This rear surface abuts against the casing member 24 when the nozzle blocks are secured in position for operation. Each nozzle block is provided with one or more nozzles or steam passages, each such steam passage comprising a cylindrical cavity or bowl 60 extending axially into the block through its convex face 50 and a passage 62 extending from the bowl to its discharge orifice in the front face 54 of the block, the passage 62 being preferably, but not necessarily, conical and being considerably smaller in diameter and cross section than the bowl 60. For efficient delivery of steam jets to the turbine blades, the conical passages 62 which may be called cones are formed so that the axis of each makes an angle of about 20° with the front face 54 of the nozzle block. Each cone axis is also tangent at its intersection with the front face 54 of the nozzle block with a circular cylinder which is coaxial with the shaft 30. The bowls 60 are preferably circular and cylindrical. The axis of each bowl is in a plane perpendicular to the axis of the cone communicating therewith. The axis of the bowl, however, is inclined with respect to the front face 54 of the nozzle block, as indicated in Figures 4 and 6. This inclination of each bowl with reference to the front face 54 avoids interference between the bowl and the cone of the next adjacent steam passage. This inclination of the bowl also results in the bowl opening through the convex face of the block approximately half way between the front and rear plane faces thereof.

Each nozzle block is secured in place against its corresponding steam belt by releasable means consisting of a series of bolts 66 which are screw-threaded through an inside arcuate rib 68 on the interior surface of the rear wall of the casing member 24 and projecting radially therefrom, the heads or inner ends of the bolts being disposed inward with respect to the rib. To strengthen the rib 68, a fillet 70 may be provided as indicated in Figure 3, the rear portion of each nozzle block being correspondingly chamfered as at 72 so as to leave a space 74 between the rear wall of the casing member 24 and the rear surface of the nozzle block. During the operation of the turbine the space 74 is filled with exhaust steam the temperature of which is much lower than that of the high-pressure steam introduced through the steam belts. This serves to avoid over-heating of the housing 32 by removing the hot zone of steam as far as possible from the bearing housing. The bolts 66 are compression bolts pressing against the concave faces of the nozzle blocks the convex faces 50 of which cooperate with the casing member 24 to enclose the fluid supply chambers or steam belts 34, 36 and 38. It is evident that since these bolts do not pass through the nozzle block, there is no problem of possible interference with the steam passages, and the bolts can be spaced as desired. Furthermore, they are not exposed so intimately to the high temperatures of the nozzle block itself. In assembling the turbine, the nozzle blocks are secured in place before the turbine wheel is inserted in the casing. The bolts 66 are set up so that their outer ends press the nozzle blocks strongly against the cylindrical surfaces of the boundary walls of the steam belts. Then the turbine diaphragm 80 is passed over the shaft 30 and is secured against the rear wall of the casing member 24 to close the circular aperture provided therein for the introduction of bearings into the bearing housing 32. The diaphragm 80 is preferably of sufficient thickness to overlap the heads or inner ends of the bolts 66, the peripheral surface of the diaphragm thus being in a position in which it is intersected by the axes of the bolts and is adjacent to the heads or inner ends thereof so that the bolts cannot come out during the operation of the machine. To insure the correct mounting of the nozzle blocks within the casing, each block may be provided with a groove 82 in its concave face to receive a bolt 66' which is a little longer than the other bolts. Since the long bolt enters a groove rather than a circular depression, the nozzle block can be readily removed from its position in the casing member 24 when the securing bolts 66 which engage the blocks are all loosened.

In the turbine shown on the drawings, the wheel is equipped with two series of vanes or buckets 84 and 86, the buckets 84 being those which receive the steam direct from the nozzles. Between these two series of buckets is a segment or segments 90 of fixed reversing vanes or buckets 92. These segments are arcuate and are located so that the buckets are opposite the orifices of the nozzles. The segments abut an annular shoulder 94 in the casing and also overlap the front face 54 of the adjacent nozzle block which is flush with the shoulder. In order to secure the segments 90 tightly against the shoulder 94 and the nozzle blocks, the following means are employed for this purpose. A circumferential groove 96 is cut in the inner surface of the casing at an accurately predetermined distance from the shoulder 94 as indicated in Figure 3a. A suitable number of oversized holes 98 for bolting the segments 90 are drilled from the outer surface of the casing opening into the groove 96 but not passing through it. Since the holes 98 are over-sized, that is, since they have a diameter greater than the width of the slot 96, these holes need not be located with precision either axially or as to their spacing apart. The interior of each hole 98 is screw-threaded so as to receive a scew plug 100 in case the hole is not to be used for bolts to secure the segments 90. Figure 3 shows a bolt 102 passing through one of the holes 98 and the groove 96, the threaded end portion of the bolt being screwed into a threaded bore 104 which has previously been made in the segment 90 and accurately spaced from the rear plane face of the segment. The diameter of the bolt 102 and bore 104 is preferably accurately equal to the width of the groove 96. The groove 96 and the bores 104 can readily be located at precise distances preferably equal from the shoulder 94 and the rear face of the segment respectively, by the use of proper tools. This accurate spacing of the groove and bores results in the bolts 102 holding the segments 90 firmly against the shoulder 94 of the casing.

I claim:

1. In a fluid-driven turbine having a casing with an interior surface and with a wheel rotatable therein, an annular shoulder on the interior surface of said casing coaxial with the wheel, a plurality of stages of buckets on the rim of the wheel, and an arcuate segment of fixed reversing buckets between successive stages, said segment having a convex arcuate face and a plane side face; means for securing said segment with its plane side face against said shoulder, said means comprising a circumferential groove in the inner surface of the casing accurately and uniformly spaced axially from said shoulder, a series of oversize radial holes extending from the outer surface of said casing inward to said groove, the diameter of each said oversize hole being greater than the width of said groove, screw-threaded bolt holes having a diameter equal to the width of said groove and extending into the convex surface of said segment, the spacing of said bolt holes from the plane face of the segment being accurately equal to the spacing between said groove and said shoulder, and bolts having a diameter accurately equal to the width of said groove extending through said oversize holes and groove and screw-threaded in said bolt holes.

2. In a fluid-driven turbine, a casing having an inner surface with a cavity therein forming a fluid supply chamber, said surface having concave arcuate portions surrounding said cavity, an arcuate nozzle block having a convex face fitting against said concave surface portion and to cover said cavity, said block having a concave face opposite to said convex face and having two plane faces, said block also having nozzle passages therethrough from the convex face to one of said plane faces but being otherwise imperforate, and releasable means pressing against said concave face to hold said convex face tightly against said inner surface portion of the casing to make a fluid-tight joint therewith.

3. Apparatus as in claim 2, said pressing means comprising an inside arcuate rib on said casing and a plurality of bolts extending through said rib and having inner and outer ends, said inner ends pressing against the concave face of the block.

4. Apparatus as in claim 3, said casing including a removable diaphragm having a peripheral surface overlapping the inner end of each said bolt, whereby removal of said bolts from said rib is prevented while the diaphragm is in place.

5. In a fluid-driven turbine having a casing which contains a fluid supply chamber and includes a wall with an inner surface, a shaft extending through said wall, and a wheel on said shaft within said casing; an arcuate nozzle block having a convex face, a concave face, and plane front and rear faces, said block having cylindrical bowls in its convex face and a conical passage extending from each bowl to the front plane face of the block, said block being located within said casing and cooperating therewith to enclose said chamber, said block having concave and convex faces concentric with said shaft and its convex face presented to said chamber, an arcuate rib on said inner surface concentric with said shaft, and a series of bolts projecting radially from said rib with outer ends pressing against the concave face of said block.

6. Apparatus as in claim 5, said bolts having inner ends disposed inward with respect to said rib, said casing including a separately removable part having surface portions intersected by the axes of said bolts and adjacent to the inner ends thereof, whereby said part when in place obstructs radially inward movement of said bolts.

7. In a fluid-driven turbine, an arcuate nozzle block having a convex face defining a circular cylinder and a plane front face perpendicular to the axis of said cylinder, said block having a series of circumferentially spaced fluid passages entering the block through said convex face and leaving through said front face, each said passage consisting of two portions having axes which are substantially perpendicular to each other, said two portions of each passage being a relatively short entering portion with a relatively large diameter extending from the convex face into the block, and a relatively long discharge portion with relatively small transverse dimensions, the axis of each discharge portion making a small angle with said front face at its point of intersection therewith and lying in a plane which is tangent at said point of intersection with a circular cylinder concentric with said convex face, the axis of said entering portion being inclined to the plane of said front face whereby a substantial thickness of material is provided between the end of said entering portion and the discharge portion of the next adjacent fluid passage.

References Cited in the file of this patent

UNITED STATES PATENTS

| | | |
|---|---|---|
| 987,842 | Waller | Mar. 28, 1911 |
| 1,490,907 | Baumann | Apr. 22, 1924 |
| 1,550,193 | Wirt | Aug. 18, 1925 |
| 1,679,496 | Ray | Aug. 7, 1928 |
| 1,809,666 | Bauer et al. | June 9, 1931 |

FOREIGN PATENTS

| | | |
|---|---|---|
| 26,713 | Great Britain | of 1909 |